United States Patent
Orieux

[15] 3,648,719
[45] Mar. 14, 1972

[54] SUBMARINE INSTALLATION

[72] Inventor: Pierre P. Orieux, Paris, France

[73] Assignee: Compagnie Francaise Des Petroles, Societe Anomyne, Paris, France

[22] Filed: Sept. 11, 1969

[21] Appl. No.: 857,091

[30] Foreign Application Priority Data

Sept. 26, 1968 France ..................................... 167632

[52] U.S. Cl. .............................. 137/315, 137/236, 137/343, 137/595, 137/798
[51] Int. Cl. .................................................... E21b 43/01
[58] Field of Search ................ 166/.5, .6; 137/315, 236, 343, 137/552, 594, 595, 599, 798, 802

[56] References Cited

UNITED STATES PATENTS

| 2,876,791 | 3/1959 | Smith ..................................... 137/315 |
| 2,923,311 | 2/1960 | Jeffrey .................................... 137/315 |
| 2,990,851 | 7/1961 | Jackson, Jr. et al. ................... 137/595 |

Primary Examiner—Robert G. Nilson
Attorney—Sughrue, Rothwell, Mion, Zinn & Macpeak

[57] ABSTRACT

A submarine installation comprising a first fixed assembly containing conduits for moving a fluid to a second sealed assembly removable from the first assembly, the second sealed assembly being capable of receiving the fluid from the first assembly and performing various control operations thereon.

4 Claims, 2 Drawing Figures

SUBMARINE INSTALLATION

BACKGROUND OF THE INVENTION

1. Field of the Invention

This invention relates to a sealed installation, isolated from the surrounding environment, involving conduits serving a certain number of control apparatuses and instruments, and, especially, a submarine petroleum installation.

The need for watching the proper operation of the surveillance and control apparatuses of mechanisms in such an installation entails a certain number of service facilities which offer no major difficulty when the installation is on land but which, on the other hand, present difficulties that make the operation of the installation prohibitive, the moment it must be placed at a certain depth below sea level.

One of the main difficulties encountered is the disconnection in deep water of such apparatuses for the purpose of bringing them back up to the surface and performing routine checks and maintenance functions thereon.

In effect, the possibility of dismantling any apparatus necessarily requires a piece of equipment with two valves; one of them upstream from the instrument and the other one downstream, in addition to attachment devices connecting each of the conduits of the instrument to the pipes of the installation.

In order to bring the instruments to be checked back up to the surface, it is necessary to have a diver operate two valves for each of the instruments and to service, in deep water, the connecting devices existing at each of the ends of the conduits that provide connection with the instrument. The time required for these operations, as well as the energy extended at these great depths make it practically impossible to use divers any time the installation involves any surveillance instruments and control devices.

This, furthermore, is the main reason why submarine petroleum drill holes currently do not have any separator at the bottom of the sea; all of the oil and gas separation installations are set up on land or on platforms or on suitable ships.

The usual separators in effect essentially involve the following: a conduit which moves the crude oil into the separator tank, a conduit for the evacuation of the oil, a conduit for the evacuation of the gas, and instruments for the surveillance of the oil level in the tank, as well as devices that will measure the gas pressure controlling the valve command mechanisms arranged on each of these conduits.

Even if we assume that the only devices to be checked are the level and pressure control devices, as well as the mechanisms that control these valves, we find that it would be necessary to install, in addition to each pair of valves equipping each of the three main conduits, as many pairs of supplementary valves and pairs of connecting devices as there are instruments to be checked. The possibility of withdrawing each of the devices used in the installation would thus make it practically impossible to operate the installation in an economical manner. It is obvious that we have, in addition to the complexity of such an installation, also the need for providing for the elimination of any attack by sea water and the effect of pounding waves.

The principal objective of this invention consists of an installation that is sealed against the surrounding environment, where the measurement or control apparatuses, as well as all of the other devices or elements whose proper operation or various characteristics we want to check on, are withdrawn simultaneously and protected against said environment by a single operation, the installation here being characterized by the fact that it involves:

a. A first assembly consisting of all of the fixed parts of the installation and in all of whose conduits move a fluid toward an apparatus to be withdrawn from the installation for control purposes, leading to at least one fixed connecting member and coming out on a surface of said member through appropriate openings;

b. A second assembly, consisting of all of the parts that are capable of being withdrawn from the installation for control purposes and possessing a surface from which extend all of the conduits receiving or transporting a fluid toward the first assembly, the second assembly being removable and being applied upon the first assembly in a sealed fashion by means of the surface;

c. A first sealed envelope, enclosing the first assembly, to the exclusion of the extremities of the conduits leading to the surface;

d. A second sealed envelope enclosing the second assembly and forming a body integrally with the surface where all of the connection conduits come out.

When such an installation is used at the bottom of the sea, it offers the advantage of providing shelter from marine attack for all the elements of the installation, including the elements that must be withdrawn so that they may be subjected to all of the desired controls on the surface.

The installation is completely isolated from the marine environment and we thus see that it suffices to provide sufficiently strong envelopes in order to place the installation at any desired depth.

Furthermore, in order to disconnect the second assembly, which is also referred to above as the removable assembly, it is sufficient to close the valve at the extremity of each conduit of the first assembly and to withdraw it from the surface with the help of a cable. The connection is likewise accomplished by simply placing the first assembly on the second, with reference markers or guides making it possible to cause the openings of the connecting surfaces to coincide.

Another object of the invention consists in an installation of this type whose connecting services are plane ore revolving surfaces, with a casing having as many openings as there are openings in said surfaces being interconnected between them and being capable of assuming two positions; one position establishing communication between the conduits of the first and of the second assembly, the other position cutting off any communication between said conduits, and said casing constituting an element of the sealed envelope of the first assembly when the removable element is separated from said assembly.

The presence of this intermediate member eliminates the need for equipping the conduits of the first assembly with valves. These conduits of the first assembly extend to the connection device and we must close them when we withdraw the removable assembly.

If the depth so permits, a diver can easily manipulate any control device for the casing or any safety device that holds the removable assembly against the casing. The withdrawal of this casing thus leaves the fixed portion of the installation perfectly sealed.

The same simple operation enables us to replace, after control, the second assembly or a similar assembly on the casing of the first assembly and, by simple displacement of the latter, to restore communication between various parts of the installation with a view to starting it up again.

Another object of the invention is to permit the withdrawal of said removable assembly by protecting its conduits against the sea. By equipping this element with a second casing, resting directly on the connecting surface and having openings identical to those of the casing of the sealed envelope of the first assembly, the casing is capable of assuming two positions, one which brings about the coincidence of its openings with those of the conduits of the removable assembly, while the other position shuts these conduits off.

The withdrawal of the removable assembly is thus performed in two steps; the passage of the first casing to the shut-off position of the first assembly; and the passage of the second casing into the shut-off position of the removable assembly.

Another object of the invention is a submarine installation permitting continuous operation, characterized by the fact that the installation involves a first fixed assembly equipped with two or more surfaces, plane or surface of revolution on which extend the conduits leading to two or more removable assemblies, the first assembly being enclosed in a sealed envelope constituting a body which is integral with two or more independent and displaceable casings capable of shutting off the conduits or putting them into communication through their openings with the conduits of the removable assemblies, the removable assemblies being individually surrounded by a sealed envelope that is an integral part of a plane or revolution surface where the conduits, leading to those of the previously mentioned first assembly, exit.

Another object of the invention is a continuously operating submarine installation of the preceding type, where the sealed envelopes of the removable assemblies each form a body with a displaceable casing shutting off in a first position all of the conduits of the removable assembly leading to the conduits of the fixed assembly and placing them in communication in a second position.

The interesting thing about such installations is that they facilitate continuous operation, regardless of the depth at which we operate. In the simplest case, involving two removable assemblies, it suffices in effect to provide, in each one of them, all of the apparatuses necessary for the operation of the fixed assembly.

When the instruments of one of the removable assemblies are to be checked, we disconnect this assembly after having placed the casing of the fixed assembly in the shut off position, while we place the casing of the second removable assembly in the communication position so that the conduits of the fixed assembly will be in contact with the casing of the second assembly. The submarine installation will then operate on the second removable assembly.

After extraction of the first removable assembly and after verification on land and maintenance, we can once again connect this assembly to the fixed assembly and, if desired, withdraw the second removable assembly in order to once again operate with the first removable assembly.

We thus have some simple and elementary operations which enable us, regardless of the depth considered, to operate an installation economically in spite of the requirements for the surveillance and maintenance of all measurement or control apparatuses used or of any control device, regardless of their number or complexity.

It is clear that we can divide the removable assembly or assemblies into as many of the subassemblies as we may desire, without having to bring only a certain group of apparatuses and elements to the surface, depending upon the frequency of control and maintenance requirements.

Other objectives and characteristics will appear in the course of the following description, prepared with reference to the attached drawings which, by way of example, represent one way of implementing this invention.

DETAILED DESCRIPTION OF PREFERRED EMBODIMENT

Figure 1:
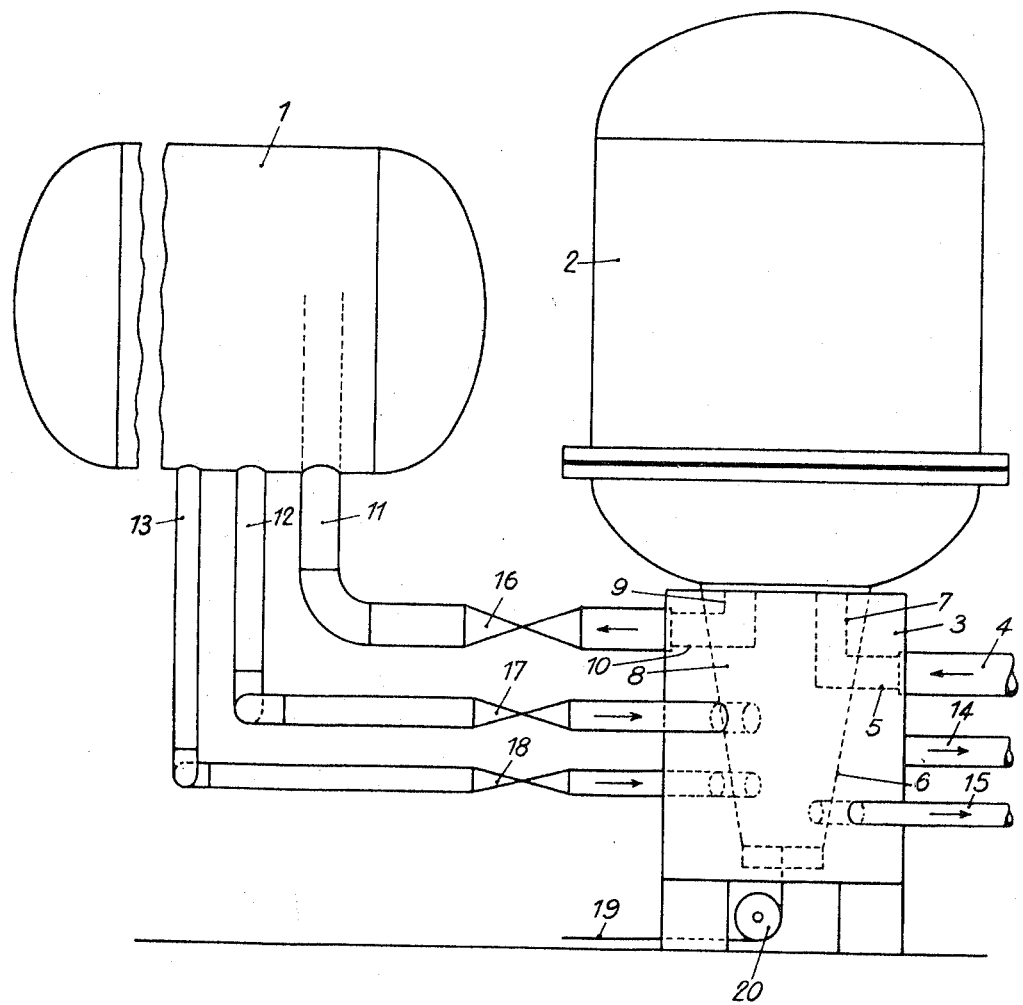
FIG. 1 represents a schematic elevational view of an example of the submarine installation according to the present invention.

In a submarine installation, for example, we have selected an installation for the separation of oil and of gas from crude oil being received from a submerged petroleum drill hole. The submarine installation consists of two assemblies 1 and 2, one fixed, the other removable. Fixed assembly 1 contains the oil and gas separator, and involves a connecting member 3 from which extend all of the conduits servicing the various control or measurement instruments or the command instruments for the installation, which must be checked periodically. All of the apparatuses used for the control of the separator and consequently all of the apparatuses controlling the various flow rates of the conduits transporting the crude to the separator, where conduits receive the oil and gas separation products, are contained in assembly 2. Since the installation can be any kind of installation and involve as many instruments as we desire, only the conduits carrying the crude and the conduits for the removal of the oil and the gas have been shown in the drawing.

Thus, the crude products coming from the extraction wells are carried via conduit 4 into a conduit 5 of connecting member 3 and from there extend via an opening in conical surface 6, to an elbow-shaped conduit 7 which is formed in conical body 8, thus extending assembly 2. Conduit 7 takes the crude to the instruments contained in the capsule 2. After completing various circuits, the crude is moved, via the duct 9 in body 8 and conduit 10 in member 3, toward conduit 11 leading to the fixed portion of separator 1. The conduits 12 and 13 take the oil and the gas coming from separator 1 toward the connecting member 3. Conduits similar to 10, situated in connecting member 3, and conduits similar to 9, in the conical portion 8 of the removable assembly, make it possible to conduct these fluids to the various apparatuses and instruments of the assembly 2. After circulation in the various apparatuses and instruments of this removable assembly 2, which, for easy terminology, we shall call a capsule, the oil and the gas are moved toward the outside with the help of conduits similar to 7, and passes through the conical portion 8 via the openings made on the conical surface 6 of member 3 and through conduits 14 and 15.

When it is desired to withdraw the various instruments and apparatuses of the submarine installation for verification purposes, it suffices to close valves 16, 17, and 18, which equip conduits 11, 12, and 13, and to withdraw capsule 2 from member 3 by simple traction, such as means of a cable controlled from the surface. The conduits 4, 14, and 15 are not part of the installation and therefore were not shown with the valves or other apparatuses that can prolong these conduits.

After completing the verification and maintenance operations on the instruments of the capsule on the surface, it suffices to lower the capsule again for example by means of a guide table, and to place the conical portion 8 in its housing 3, in order to start the submarine installation up again. In order to make this operation easier, guide table 19 is connected to the lower end of the conical portion 8 and passes over pulley 20. The correct placement of capsule 2 or, more exactly, of the conical portion 8 with respect to member 3 is accomplished either with the help of reference markers or with the help of any kind of self-guidance means, permitting conduits 7 and 9, which service conduits 4 and 11, to be placed opposite the corresponding openings of conduits 5 and 10. It thus suffices once again to open the valves of the various conduits and especially valves 16, 17, and 18, in order to permit the installation to resume its normal operation.

Figure 2:
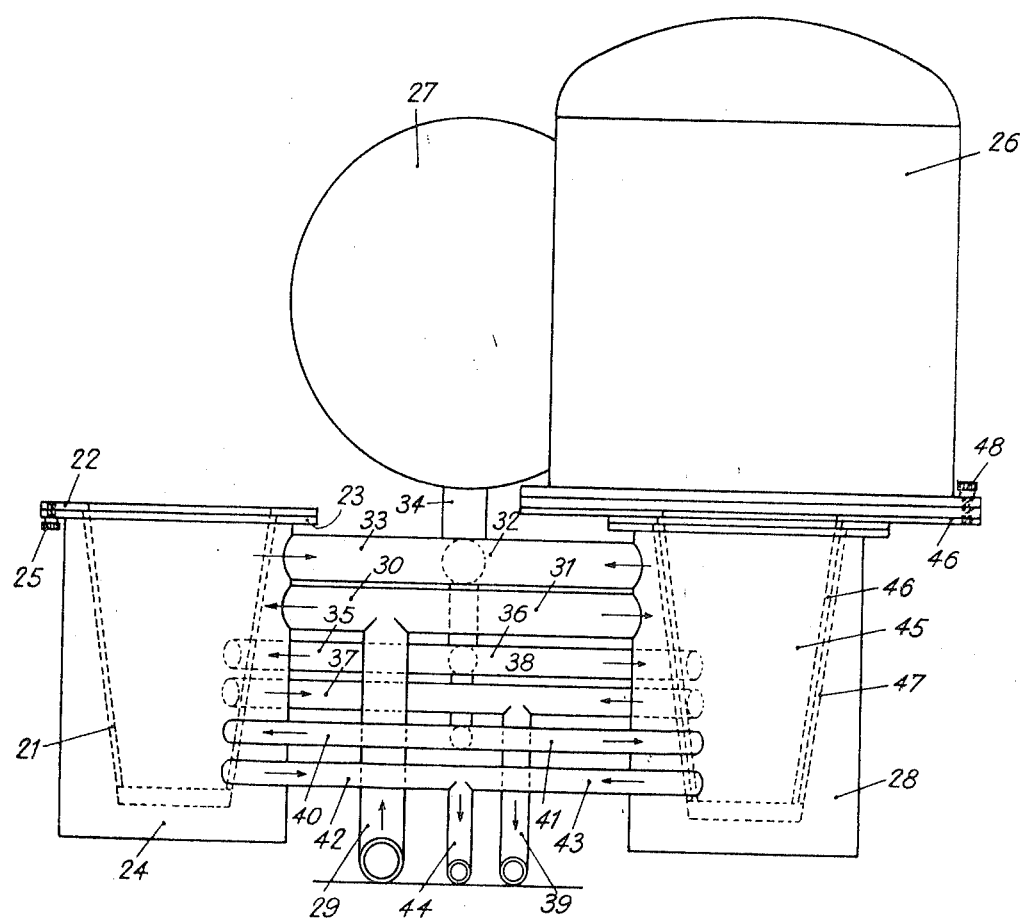
FIG. 2 is a schematic elevational view of a submarine installation involving a fixed assembly and two associated removable assemblies.

In order to avoid having to handle even these few valves, we equip member 3 with a casing, such as it is shown at 21 in FIG. 2. Casing 21 is held by its ring-shaped portion 22 on the edge 23 of connecting member 24 by means of any attachment device, for example, bolt 25. This casing is capable of turning around the axis of member 26 and has a number of openings equal to the number of conduits traversing the connecting organ 24 and situated in such a manner that the casing assures the passage of fluids into a given position and interrupts any circulation outside of that position.

Thus, we see that, contrary to the preceding version, where is was necessary to close the valves, such as 16, 17, and 18, the use of the device shown in FIG. 2 enables us to withdraw the capsule containing the instruments to be checked on the surface after a simple rotation of casing 21, so as to cut off the circulation of liquids such as conduits 4 and 14 to 18 shown in FIG. 1.

The rotation of casing 21 can be accomplished after loosening bolts 25 with the help of any manual or automatic means such as a lever attached to the periphery 22 or to the lower portion of the casing, an endless screw moving a dented wheel attached to one end of the casing, said rotation being capable of being preceded by the raising of the casing with the help of any already known cam devices. Such means, which are known in themselves, are not a part of the invention and were not shown. The capsule is remounted in an identical manner by guiding its descending movement with the help of a cable similar to cable 19, guided by pulley 20, in FIG. 1. After having applied the conical portion of the capsule, whose instruments have been verified, to the interior of casing 21 and making the reference markers on the casing and on the conical portion of the capsule coincide, so as to bring about the coincidence of the openings of the jacket casing with those of the conduits of the capsule, we can once again start the installation operating with the help of the instruments that have been checked. For this purpose, it is sufficient to turn casing 21, which is attached to the capsule, in such a manner as to move it opposite a reference marker placed on member 24, with the openings of casing 21 and consequently the conduits of the conical portion of the capsule being then opposite the openings of the conduits of member 24.

In order to prevent any interruption in the separation installation, we equip the fixed portion with two identical removable assemblies, one of which has been shown at 26 in FIG. 2, while the other one has been removed after casing 21 has been fixed in a position where it can close the openings in the conduits of connecting member 24. In this version, the fixed assembly is made up of separator 27 properly speaking and of the two connecting members 24 and 28. Each capsule, such as 26, contains the assembly of devices and apparatuses necessary for the functioning of the installation. One of the capsules can thus be withdrawn in order to undergo the various control and maintenance operations on the surface, while the other capsule assures permanent operation of separator 27. For this purpose, and going back to the first example, conduit 29, which moves the crude toward the separation unit, is divided into two sections 30 and 31, leading, respectively, to connecting members 24 and 28. After circulation in capsule 26, the crude is directed toward the separator via conduit 32. Similarly, after circulation in the second capsule, when the latter is in operation, the crude is directed toward separator 27 via conduit 33, while the two conduits 32 and 33 are connected to conduit 34. The oil conduits coming from separator 27 are directed by conduits 35 and 36 toward the connecting members 24 and 28 and from there toward the corresponding capsules. The oil comes out of them via conduits 37 and 38 leading to conduit 39. Finally, the gas coming from separator 27 is directed via conduits 40 and 41 into the capsules from where they come out via conduits 42 and 43, connected to common conduit 44.

As we explained earlier, we withdraw one capsule after having manipulated the corresponding casing, such as 22, in such a way as to obturate all of the conduits of the circuits connecting the removable assembly considered to the fixed assembly 27. In order to prevent the penetration of sea water into the interior of the capsule or into the interior of the conduits leading there, we surround the truncated cone 45, for example, of each capsule with a casing 46 which has the same role as casing 21 with respect to fixed member 24.

Thus, in order to withdraw capsule 26, after having replaced the other capsule in the connecting member 24, we begin by turning casing 47 as indicated earlier, while assembly 26 and casing 46 accompany 47 in its rotation. Casing 47 is fixed in its conduit closed position and we keep casings 46 and 47 together; we slightly raise capsule 26, after having loosened the attachment bolts 48, and we turn it by a sufficient angle so as to move all of the openings of the conduits of the capsule opposite the areas of casing 46 which are devoid of openings. It then suffices to cause body 26 to come to rest and to attach it to casing 46 in order to raise the assembly to the surface and perform the verification and maintenance operations. During the operation of raising the capsule with respect to casing 46 or while raising casing 47, we clean out the interstice between the momentarily separated bodies by means of oil drawn from one of the conduits by means of a flexible conduit.

We can thus set up a submarine installation that can operate continuously during the withdrawal of one or the other capsules containing the instruments and apparatuses that control the installation.

Although we have described so far only one example of this idea as applied to submarine petroleum installation, it is obvious we could have selected other, more complex examples, in other words, the installation could be situated in a corrosive environment, and we could use not just one removable assembly but several assemblies and subassemblies and eventually double some among them so as to obtain an installation that will operate continuously, regardless of the number of subassemblies that have to undergo permanent control and maintenance operations.

What is claimed is:

1. An installation constituting a sealed unit comprising elements requiring periodic control, fixed elements not requiring any control, an assembly of conduits connecting said elements to be controlled to said fixed elements, and a fixed connecting member, said installation being characterized by:
   a. a first assembly made up of all of the fixed elements of the installation with the exception of all of the elements to be controlled, the assembly of the conduit connecting said fixed elements to said elements to be controlled including a fixed portion leading to the fixed connecting member so as to extend to one and the same surface of said member, said surface being a revolution surface and having openings corresponding to said conduits,
   b. a second mobile assembly consisting of all of the elements to be controlled with the exception of any fixed element, said assembly including a sealed revolution surface cooperable with said surface of the fixed connecting member, openings being provided on said sealed surface to coincide with said openings of the surface of the fixed connecting member, whereby by means of appropriate conduits said fixed portions of the conduits are connected to the elements to be controlled;
   c. a first sealed envelope enclosing said first assembly of fixed elements with the exception of said connecting member;
   d. a second sealed envelope enclosing said second assembly of elements to be controlled with the exception of said sealed surface; and
   e. valve means between said first assembly and said second assembly for cutting off communication between said conduits and the elements to be controlled to enable said mobile assembly to be removed from said connecting member, said valve means comprising a mobile casing having as many openings as said surfaces and being movably disposed between said surfaces so as to interrupt communication between the openings of said surfaces in a first position and to establish communication therebetween in a second position.

2. The installation as claimed in claim 1 wherein said mobile member is movably mounted on the fixed connecting member.

3. The installation as claimed in claim 1 further comprising at least two fixed connecting members attached to said fixed assembly, and a corresponding number of mobile assemblies each cooperating with one of said connecting members.

4. The installation as claimed in claim 3 wherein at least two of the mobile assemblies are identical, and said valve means comprises at least two mobile members, one for each mobile assembly, one of the mobile members of one of the identical mobile assemblies serving to interrupt communication between the corresponding openings of one mobile assembly and connecting member while another mobile member serves to establish communication between the corresponding openings of the other mobile assembly and connecting member.